(12) United States Patent
Okamura et al.

(10) Patent No.: US 8,822,361 B2
(45) Date of Patent: Sep. 2, 2014

(54) CUBIC BORON NITRIDE SINTERED BODY TOOL

(75) Inventors: Katsumi Okamura, Itami (JP); Machiko Abe, Itami (JP); Satoru Kukino, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 10 days.

(21) Appl. No.: 13/521,325

(22) PCT Filed: Oct. 7, 2011

(86) PCT No.: PCT/JP2011/073179
§ 371 (c)(1),
(2), (4) Date: Jul. 10, 2012

(87) PCT Pub. No.: WO2012/053375
PCT Pub. Date: Apr. 26, 2012

(65) Prior Publication Data
US 2012/0302425 A1 Nov. 29, 2012

(30) Foreign Application Priority Data

Oct. 19, 2010 (JP) ................................. 2010-234589

(51) Int. Cl.
| | | |
|---|---|---|
| *C04B 35/5831* | (2006.01) | |
| *C04B 35/628* | (2006.01) | |
| *B22F 1/02* | (2006.01) | |
| C22C 26/00 | (2006.01) | |
| B22F 5/00 | (2006.01) | |

(52) U.S. Cl.
CPC ..... *C04B 35/5831* (2013.01); C04B 2235/5436 (2013.01); *C04B 35/62842* (2013.01); C22C 2026/006 (2013.01); C22C 2026/008 (2013.01); C04B 2235/3217 (2013.01); C04B 2235/3843 (2013.01); C22C 2026/003 (2013.01); *B22F 1/025* (2013.01); B22F 2005/002 (2013.01); C04B 2235/402 (2013.01); C04B 2235/3804 (2013.01); *C22C 26/00* (2013.01); C22C 2026/005 (2013.01); B23B 226/125 (2013.01); C04B 2235/3813 (2013.01)
USPC .......................................................... 501/96.4

(58) Field of Classification Search
CPC .................................................. C04B 35/5831
USPC ....................................................... 501/96.4
See application file for complete search history.

(56) References Cited

U.S. PATENT DOCUMENTS

| | | | | |
|---|---|---|---|---|
| 4,186,022 | A * | 1/1980 | Ordanian et al. | 501/87 |
| 5,328,875 | A * | 7/1994 | Ueda et al. | 501/87 |
| 5,596,156 | A | 1/1997 | Fukaya et al. | |
| 7,670,980 | B2 * | 3/2010 | Dahl | 501/96.4 |
| 7,867,438 | B2 * | 1/2011 | Can et al. | 419/10 |
| 8,007,552 | B2 * | 8/2011 | Can et al. | 51/307 |
| 8,105,966 | B2 * | 1/2012 | Dahl et al. | 501/96.4 |
| 2005/0187093 | A1 * | 8/2005 | McHale et al. | 501/96.4 |
| 2007/0099030 | A1 | 5/2007 | Dahl | |
| 2008/0264203 | A1 | 10/2008 | Dahl et al. | |
| 2008/0286558 | A1 | 11/2008 | Kukino et al. | |
| 2009/0056232 | A1 | 3/2009 | Can et al. | |
| 2009/0080986 | A1 * | 3/2009 | Can et al. | 407/119 |

FOREIGN PATENT DOCUMENTS

| | | | |
|---|---|---|---|
| CN | 1978383 A | | 6/2007 |
| CN | 101084169 A | | 12/2007 |
| CN | 101293773 A | | 10/2008 |
| JP | 60145351 | * | 7/1985 |
| JP | 7-082031 | | 3/1995 |
| JP | 08034669 | * | 2/1996 |
| JP | 8-120391 | | 5/1996 |
| JP | 2000-044347 | | 2/2000 |
| JP | 2000-044350 | | 2/2000 |
| JP | 2007-144615 | | 6/2007 |
| JP | 2008-528413 | | 7/2008 |
| JP | 2008-222485 | | 9/2008 |
| JP | 2008-272929 | | 11/2008 |
| WO | WO-2006/046125 A1 | | 5/2006 |
| WO | WO-2007/057995 A1 | | 5/2007 |

OTHER PUBLICATIONS

Office Action in Chinese Patent Application No. 201180006194.0, dated Nov. 21, 2013.

* cited by examiner

*Primary Examiner* — Karl Group
(74) *Attorney, Agent, or Firm* — Venable LLP; Michael A. Sartori; Tamatane J. Aga

(57) ABSTRACT

The cubic boron nitride sintered body tool of the present invention has a cubic boron nitride sintered body including cubic boron nitride particles and a binder phase at at least a cutting edge. The cubic boron nitride sintered body includes 40-70 volume % of cubic boron nitride particles. The binder phase includes a first component and a second component. The first component includes TiC, and the second component includes one or both of $TiB_2$ and $AlB_2$. When the X-ray diffraction intensity of plane (200) of the first component is $I_1$ and the X-ray diffraction intensity of plane (101) of said second component is $I_2$, $I_1$ is the maximum of the X-ray diffraction intensity of all components in the cubic boron nitride sintered body excluding the cubic boron nitride particles, and satisfies $0.01 \leq I_2/I_1 \leq 0.1$.

1 Claim, No Drawings

CUBIC BORON NITRIDE SINTERED BODY TOOL

TECHNICAL FIELD

The present invention relates to cubic boron nitride sintered body tools, particularly a cubic boron nitride sintered body tool greatly superior in heat resistance and chipping resistance.

BACKGROUND ART

A cubic boron nitride (hereinafter, also referred to as "cBN") sintered body employed in a cBN sintered body tool is evaluated as a material that can achieve a long service life at high efficiency by virtue of its chemical stability, low affinity with iron, and high hardness, as compared with conventional cemented carbide tools. Such cBN sintered body tools, when applied to cutting tools, are advantageous in that they have flexibility further superior than that of the grinding tool, low load on the environment, and the like. Thus, cBN sintered body tools have replaced conventional tools in the processing of iron type materials that are difficult to be worked with.

The cBN sintered body is mainly classified into two types of compositions, i.e. high cBN content sintered body and low cBN content sintered body. The former has a high content ratio of cBN particles that directly bind with each other, and the remainder is bound by a binder with Co and/or Al as the main component. The latter exhibits a low ratio of contact between cBN particles due to the low content ratio of cBN particles, and is bound via ceramic having low affinity with iron such as Ti nitrides (TiN) and carbides (TiC). These two types of cBN sintered bodies correspond to different workpieces that are to be subject to cutting work due to the difference in the cBN content ratio. Suitable workpieces for each type of cBN sintered body will be described hereinafter.

During the cutting work of iron-based sintered components governed by mechanical wear and damage caused by the contact with hard grains and during the cutting work of gray cast iron governed by damage caused by thermal shock at the time of intermittent machining at high speed, shear heat caused by swarf does not readily occur since the swarf is easily divided into small pieces. In the cutting work of such material, machining is suitably performed by means of the former high cBN content sintered body. In other words, in the cutting work of gray cast iron or the like, a high cBN content sintered body provides significant stability and long service life by virtue of the superior machine property (high hardness, high strength, high toughness) and high thermal conductivity of cBN.

However, in the case where a high cBN content sintered body is applied to the machining of hardened steel, shear heat will be generated due to the high hardness and continuous swarf. The cutting edge of the high cBN content sintered body is exposed to high temperature, and wear is promptly developed by the reaction between cBN and iron. Thus, a sufficient tool service life cannot be obtained.

Therefore, in the machining of hardened steel, the usage of a low cBN content sintered body is preferable. In other words, a low cBN content sintered body exhibits superior wear resistance particularly at high temperature since it contains a large amount of binder based on TiN or TiC ceramics that has low affinity with iron under high temperature. A tool service life ten to several ten times that of a conventional tool can be achieved. A low cBN content sintered body having such property opened up the cutting market for hardened steel.

Recently in the field of vehicle industry, some of the automobile manufacturers have come to use high-strength cast iron members that are extremely thin, directed to improving the performance and reducing the weight of automobiles. For example, cylinder blocks made of flake graphite cast iron have been modified to cylinder blocks made of vermicular cast iron, and the material of the differential case that is a component of the vehicle has been changed from FCD450 to FCD700. The last three figures of FCD indicate the tensile strength, implying higher strength as the numeric value becomes higher. In accordance with such change of material, the need arises for a tool that can work on high-strength cast iron material at high efficiency and high accuracy.

A material of high strength such as ductile cast iron could be machined only at the rate of 200 m/min. at most using a conventional cemented carbide tool or ceramic tool. Further, the cutting rate was 300 to 400 m/min. at best even if a conventional cBN sintered body tool was used, and the service life of the tool was not of a level that is satisfactory.

For example, Japanese Patent Laying-Open No. 08-120391 (PTL 1) discloses the composition of a cBN sintered body that can cut ductile cast iron with a long service life. Specifically, a long service life of the cBN sintered body is achieved according to PTL 1 by employing carbonitride of any of Hf, TiHf, group IVa element, group Va element, and group VIa element of the periodic table for the main component constituting the binder phase of the cBN sintered body. However, further improvement in wear resistance is required for the cBN sintered body of PTL 1 to satisfy the recent requirement of high speed and long service life.

Further, Japanese Patent Laying-Open No. 2008-222485 (PTL 2) and WO2007/057995 (PTL 3) disclose a covered composite sintered body having a high cBN content sintered body coated with ceramics. However, the wear resistance of the cBN sintered body that is the base material is not sufficient by any of the covered composite sintered bodies. Further improvement in wear resistance is required.

Moreover, Japanese Patent Laying-Open No. 2000-044347 (PTL 4) and Japanese Patent Laying-Open No. 2000-044350 (PTL 5) disclose a cBN sintered body obtained by covering cBN particles with a metal nitride layer such as TiN and AlN, and sintering the same with a material constituting a binder phase.

CITATION LIST

Patent Literature

PTL 1: Japanese Patent Laying-Open No. 08-120391
PTL 2: Japanese Patent Laying-Open No. 2008-222485
PTL 3: WO2007/057995
PTL 4: Japanese Patent Laying-Open No. 2000-044347
PTL 5: Japanese Patent Laying-Open No. 2000-044350

SUMMARY OF INVENTION

Technical Problem

When the surface of a cBN sintered body is covered with a metal nitride layer as disclosed in PTLs 4 and 5 set forth above, there was a problem that chipping readily occurs due to the insufficient binding between cBN particles. In view of the issues set forth above, an object of the present invention is to achieve a long service life of a cubic boron nitride sintered body tool by high compatibility between heat resistance and chipping resistance in a cubic boron nitride sintered body.

Solution to Problem

A conventionally used cBN sintered body for machining ductile cast iron was made of cBN corresponding to the content of approximately the half, and the remainder based on a binder phase including Ti carbide and carbonitride and an Al compound as the main components. The binder phase includes a slight amount of $TiB_2$ and $AlB_2$, generated during the process of sintering a cBN sinter body.

The inventors conducted a study on the correlation between the wear rate and material strength based on the modification of the composition ratio of the components constituting the binder phase, and found out that a higher content of boride such as $TiB_2$ and $AlB_2$ tends to improve the material strength while the wear rate is increased. Furthermore, upon studying the change in the material strength and wear rate when the peak intensity ratio of the X-ray diffraction between TiC and $TiB_2$ or $AlB_2$ was altered, it was found out that, instead of a simple trade off between the material strength and wear rate, there is a state under which compatibility between material strength and wear resistance is achieved. Based on this finding, the present invention was completed upon diligent study.

The cubic boron nitride sintered body tool of the present invention has a cubic boron nitride sintered body including cubic boron nitride particles and a binder phase at at least a cutting edge. The cubic boron nitride sintered body includes 40-70 volume % (greater than or equal to 40 volume % and less than or equal to 70 volume %; hereinafter, the same meaning applies under the same notation, unless otherwise stated) of cubic boron nitride particles. The binder phase includes a first component and a second component. The first component includes TiC, and the second component includes one or both of $TiB_2$ and $AlB_2$. $I_1$ that is the X-ray diffraction intensity of plane (200) of the first component is the highest among the X-ray diffraction intensity of all components in the cubic boron nitride sintered body excluding cubic boron nitride particles, and satisfies $0.01 \leq I_2/I_1 \leq 0.1$, where $I_2$ is the X-ray diffraction intensity of plane (101) of the second component.

At least a portion of the second component is present so as to come into contact with the surface of the cubic boron nitride particle. The surface-constituting ratio of the second component at the surface of cubic boron nitride particle is 20-70%. The binder phase preferably includes 1-10 volume % of the second component.

Advantageous Effects of Invention

The cubic boron nitride sintered body tool of the present invention, based on the configuration set forth above, achieves high compatibility between heat resistance and chipping resistance in a cubic boron nitride sintered body, whereby a long service life of a cubic boron nitride sintered body tool can be achieved.

DESCRIPTION OF EMBODIMENTS

Each configuration of a cubic boron nitride sintered body tool of the present invention will be described hereinafter.

Cubic Boron Nitride Sintered Body Tool

The cBN sintered body tool of the present invention has a cBN sintered body including cBN particles and a binder phase at at least the cutting edge. In other words, the cBN sintered body tool may be formed of only a cBN sintered body, or may have a cBN sintered body joined to the cutting edge of a substrate such as of cemented carbide, cermet, and the like using a binder. Further, the surface of the cBN sintered body tool may be covered with a hard ceramics coat layer. For the hard ceramics coat layer, the well-known composition can be employed. In the present invention, "cutting edge" implies the region brought into contact with a workpiece.

Since the cBN sintered body tool of the present invention can achieve high compatibility between heat resistance and chipping resistance by the usage of a cBN sintered body that will be described afterwards, cutting work at a high cutting speed such as greater than or equal to 400 m/min., even for ductile cast iron (austempered graphite cast iron) and vermicular cast iron (flake graphite cast iron) is allowed. Moreover, a long service life can be achieved.

The cBN sintered body tool of the present invention, when employed in cutting work applications, is extremely useful for turning work, milling work, and the like.

Cubic Boron Nitride Sintered Body

The cBN sintered body of the present invention is characterized in including cBN particles and a binder phase, having 40-70 volume % of cBN particles. By including cBN particles under such a volume ratio, superior balance is established between the strength and heat resistance of the cubic boron nitride sintered body, allowing high compatibility between heat resistance and chipping resistance. If the cBN particles are less than 40 volume %, the strength is insufficient in the cutting of ductile cast iron that cannot be readily cut, and the chipping resistance will be degraded. If cBN particles exceed 70 volume %, the heat resistance will be degraded since the content of the binder phase becomes relatively low. The cBN will react by the heat generated during cutting to facilitate wear. The volume ratio of cBN particles is preferably greater than or equal to 50 volume % and less than or equal to 65 volume %. In the present invention, the cBN sintered body may further include another component in addition to the cBN particles and binder phase.

Cubic Boron Nitride Particles

From the standpoint of improving the material strength, the cBN particles in the cBN sintered body of the present invention preferably has a small average grain size, preferably less than or equal to 6 μm. From the standpoint of not degrading the toughness of the cBN sintered body, the average grain size of the cBN particles is preferably greater than or equal to 0.1 μm. From the standpoint of the balance between the material strength and toughness, the average grain size of the cBN particles is preferably greater than or equal to 1 μm and less than or equal to 4 μm. Moreover, cBN particles are used preferably having the surface covered with a metal layer. The reason thereof and such a metal layer will be described afterwards.

Binder Phase

In the present invention, the binder phase is characterized in exhibiting bonding action of cBN particles, and includes a first component and a second component. The first component includes TiC, and the second component includes one or both of $TiB_2$ and $AlB_2$.

When the X-ray diffraction intensity of plane (200) of the first component is $I_1$ and the X-ray diffraction intensity of plane (101) of the second component is $I_2$, $I_1$ is the maximum of the X-ray diffraction intensity of all components in the cubic boron nitride sintered body excluding cubic boron nitride particles, and satisfies $0.01 \leq I_2/I_1 \leq 0.1$. By including first and second components at such a specific X-ray diffraction intensity ratio, favorable balance of the composition between the first component and the second component is established, leading to significant improvement in heat resistance and chipping resistance. More preferably, the X-ray diffraction intensity is $0.02 \leq I_2/I_1 \leq 0.05$. If $I_2/I_1$ is less than 0.01, the bond between cBN particles cannot be increased, leading to degradation in chipping resistance. If $I_2/I_1$ exceeds 0.1, the content of TiC superior in wear resistance will be relatively lowered, whereas the contents of $TiB_2$ and $AlB_2$ inferior in wear resistance will be increased, leading to significant degradation in the wear resistance of the cBN sintered body. $TiB_2$ and $AlB_2$ constituting the second component have a peak wavelength of their X-ray diffraction extremely approximating each other. Therefore, although it is difficult to identify whether the X-ray diffraction intensity $I_2$ of plane (101) of the second component originates from $TiB_2$ or from $AlB_2$, either is permissible.

In the present invention, the binder phase preferably includes 1-10 volume % of the second component formed of metal boride. By including the second component in such a volume ratio, the bonding of cBN particles can be increased, and the wear resistance of the cBN sintered body can be improved. More preferably, 3-7 volume % of the second component is included. If the second component is less than 1 volume %, the bonding of cBN particles may not be sufficient, leading to degradation in strength. If the second component exceeds 10 volume %, the wear resistance will be degraded.

In the present invention, the second component is advantageous in increasing the binding between the cBN particles and the binder phase, and disadvantageous in that a large amount in the binder phase causes degradation in the wear resistance. Therefore, the second component is included at high concentration locally at only the periphery of cBN particles. Accordingly, the binding of cBN particles can be increased, leading to improving the strength of the cBN sintered body. For the purpose of disposing the second component locally around the cBN particles, preferably a coat of metal constituting the second component (hereinafter, referred to as "metal layer") is applied to the surface of cBN particles, then mixed with raw material power constituting the binder phase, and subjected to sintering.

The composition of the metal layer coat on the cBN particles is preferably one or both of Ti and Al, more preferably TiAl. Further, the metal layer is applied as a coat preferably of 1-40 mass %, more preferably 5-20 mass %, to the mass ratio of the cBN particles.

In the present invention, the surface-constituting ratio of the second component occupying the surface of the cBN particle is preferably 20-70%, more preferably 40-60%. By satisfying such surface-constituting ratio, the wear resistance and chipping resistance of the cBN sintered body can be further improved. As used herein, "surface-constituting ratio" is directed to quantitatively evaluating the second component disposed locally around the cBN particle, and is calculated as set forth below.

First, the cBN sintered body of the present invention is cut along an arbitrary cross section, and one or more observation images of 10000× in magnification, when observed by SEM, are prepared. 20 cBN particles having a grain size greater than or equal to 1 μm, among the cBN particles appearing on such an observation image are arbitrarily selected, and the sum of the outer perimeter thereof is calculated. Then, the sum of the length of the region of each of the 20 cBN particles in contact with the second component is calculated. The value of the sum of the length of the region in contact with the second component divided by the sum of the outer perimeter of the cBN particles, in percentage, is taken as the surface-constituting ratio of the second component at the surface of the cBN particle.

A surface-constituting ratio less than 20% is not preferable since the bonding of the cBN particles will be degraded. If the surface-constituting ratio exceeds 70%, the heat resistance will be degraded since the content other than the second component would be relatively lowered. Accordingly, the heat generated during the cutting work will be increased to easily cause reaction of the cBN particles, facilitating wear.

The binder phase may include only the first component and second component, or may include another component in addition to the first and second components. The additional component includes well known components, for example, at least one type of a compound including at least one element selected from the group consisting of an element of group IVa, an element of group Va, an element of group VIa of the periodic table and Al, and at least one element selected from the group consisting of nitrogen, carbon, and boron (provided that TIC, $TiB_2$ and $AlB_2$ are excluded), or a mutual solid solution of the relevant compound.

Method of Producing cBN Sintered Body

The cBN sintered body employed in the present invention is produced as set forth below. First, the surface of the cBN particles is preferably covered with a metal layer formed of one or both of Ti and Al. Such a metal layer is applied by RF sputtering PVD, for example. The cBN particles covered with a metal layer and raw material powder constituting a binder phase are introduced into an ultrahigh pressure apparatus. The mixed powder thereof is subjected to ultrahigh pressure sintering to produce a cBN sintered body. By covering the surface of cBN particles with a metal layer prior to sintering, the second component ($TiB_2$ or $AlB_2$) is locally disposed around the cBN particles subsequent to sintering, allowing the bonding between the cBN particles and binder phase to be improved.

Conventionally, the surface of cBN particles were covered with a metal nitride layer, followed by mixing with the raw material powder of a binder phase to be subjected to sintering. Although the conventional approach to covering cBN particles with a metal nitride layer may seem to be common, according to the technical view, to the approach to covering cBN particles with a metal layer defined in the present invention, it is to be noted that a metal nitride layer and a metal layer exhibit completely opposite characteristics from the standpoint of diffusion of boron included in the cBN particles. Specifically, the present invention has the surface of cBN particles covered with a metal layer for the purpose of promoting diffusion of the boron constituting the cBN particles into the binder phase (particularly, so as to constitute the second component), whereas the conventional covering with a metal nitride layer is applied to prevent diffusion of boron from the cBN particles. Therefore, the configuration of the present invention (that is, covering with a metal layer) cannot be readily derived from conventional art.

The pressure during the ultrahigh pressure sintering set forth above is preferably greater than or equal to 5.5 GPa and less than or equal to 7 GPa. The temperature during the ultrahigh pressure sintering is preferably greater than or equal to 1200° C. and less than or equal to 1500° C. The time required for the ultrahigh pressure sintering process is preferably greater than or equal to 5 minutes and less than or equal to 30 minutes. The volume ratio of the cBN particles subjected to ultrahigh pressure sintering is approximately 2-3 mass % lower than the volume ratio of cBN particles at the stage of mixing raw material powder.

EXAMPLES

Although the present invention will be described in further detail based on examples, it is to be understood that the present invention is not limited thereto.

Example 1

A cBN sintered body tool was produced as set forth below. First, the surface of cBN particles having an average grain size of 3 μm was covered with a metal layer formed of TiAl using an RF sputtering PVD apparatus. The sputtering was carried out under the conditions of an argon gas flow at 14.0 ccm with the power of 2 kW/h for eight and a half hours, with the revolution of the chamber at 18 Hz, such that the mass ratio to the surface of the cBN particles was 15 mass %.

Then, a protection layer formed of an extremely thin film of TiAlN was applied on the topmost surface of the metal layer. The covering was carried out under the conditions of a flow of argon gas at 14.0 ccm and nitrogen gas at 7.0 ccm under the same power and chamber revolution set forth above for applying the metal layer, for 30 minutes.

Then, TiC powder having an average grain size of 1 μm and Al power having an average grain size of 4 μm were pulverized and mixed to attain the mass ratio of TiC:Al=95:5, then subjected to thermal treatment in vacuum at 1200° C. for 30 minutes to obtain a compound. The compound was pulverized evenly by a ball mill crushing method using a 6 mm-diameter ball medium made of cemented carbide to obtain the raw material power constituting the binder phase.

Then, the cBN particles covered with a metal layer and the raw material powder constituting the binder phase were blended to attain the composition indicated in the column of "cBN content ratio" in Table 1, and mixed evenly by a ball mill mixing method using a 3 mm-diameter ball medium made of boron nitride. The mixed powder was layered on a support plate made of cemented carbide, and filled into a capsule made of Mo, followed by sintering for 30 minutes at the pressure of 5.5 GPa and temperature of 1400° C. using an ultrahigh pressure apparatus to obtain a cBN sintered body.

Examples 2-7

Comparative Examples 1-4

The cBN sintered body tools of Examples 2-7 and Comparative Examples 1-4 were produced through a method similar to that of Example 1, provided that the cBN content ratio, coverage of the metal layer, and the composition and mass ratio of the raw material powder constituting the binder phase were altered as set forth in Table 1. Particularly, the mass ratio of the metal phase corresponding to the coverage of the metal layer was adjusted so as to attain the value of "$I_2/I_1$" set forth in Table 1 that will be described afterwards. For example, in Example 2, the volume ratio of the cBN particles in the cBN sintered body was 60 volume %, the amount of the metal layer covering the surface of the cBN particles was 10 mass %, and 97 mass % of TiC and 3 mass % of Al were taken as the raw material powder constituting the binder phase corresponding to the remainder. A cBN sintered body tool of Comparative Example 3 was produced by a method identical to that of Example 2, provided that cBN particles not covered with a metal layer were employed, relative to the cBN sintered body tool of Example 2.

Example 8

A cBN sintered body tool was produced as set forth below. First, cBN particles having an average grain size of 2 μm were covered with a metal layer formed of 15 mass % of TiAl using an RF sputtering PVD apparatus. Then, TiC powder having an average grain size of 1.5 μm and Al powder having an average grain size of 3 μm were mixed to attain the mass ratio of TiC:Al=95:5, and subjected to heat treatment for 30 minutes in vacuum at 1200° C. to obtain a compound. This compound was pulverized evenly by a ball mill crushing method using a 6 mm-diameter ball medium made of cemented carbide to obtain the raw material power constituting the binder phase.

Then, to attain the "cBN content ratio" in Table 1, the cBN particles covered with a metal layer, cBN particles not covered, and raw material powder constituting the binder phase were blended to attain the mass ratio of 12:50:38, and then mixed evenly by a ball mill mixing method using a 3 mm-diameter ball medium made of boron nitride. The mixed powder was layered on a support plate made of cemented carbide, and filled into a capsule made of Mo, followed by sintering for 30 minutes at the pressure of 5.5 GPa and temperature of 1400° C. using an ultrahigh pressure apparatus to obtain a cBN sintered body.

Examples 9-12

The cBN sintered body tools of Examples 9-12 were produced by a method similar to that of Example 8, provided that the mixing ratio of the cBN particles covered with a metal layer and the cBN particles not covered was altered as set forth in Table 2, relative to the cBN sintered body tool of Example 8. By altering the mixing ratio of cBN particles, the volume ratio and surface-constituting ratio of the second component in the cBN sintered body of Examples 9-12 were adjusted, as indicated in the column of "second component content ratio" and "surface-constituting ratio" defined in Table 3 set forth afterwards.

The cBN sintered body tool of each of the examples produced as set forth above has a cubic boron nitride sintered body including cubic boron nitride particles and a binder phase at at least the cutting edge. The cubic boron nitride sintered body includes 40-70 volume % of cubic boron nitride particles. The binder phase includes a first component and a second component. The first component includes TiC, and the second component includes one or both of $TiB_2$ and $AlB_2$. When X-ray diffraction intensity of plane (200) of the first component is $I_1$ and X-ray diffraction intensity of plane (101) of the second component is $I_2$, $I_1$ is the maximum of the X-ray diffraction intensity of all components in the cubic boron nitride sintered body excluding said cubic boron nitride particles, and satisfies $0.01 \le I_2/I_1 \le 0.1$.

Comparative Example 5

A commercially available cBN sintered body (product name: BX930 (made by Tungaloy Corporation) was employed.

Comparative Example 6

A commercially available cBN sintered body (product name: MB710 (made by Mitsubishi Material Corporation)) was employed.

TABLE 1

|  |  | cBN content ratio (volume %) | Coverage (mass %)[*1] | Raw material constituting binder phase[*2] | Compound constituting cBN sintered body | $I_2/I_1$ | Tool service life (km) | Damage type |
|---|---|---|---|---|---|---|---|---|
| Example | 1 | 40 | 15 | TiC(95), Al(5) | cBN, TiC, TiB$_2$(AlB$_2$), Al$_2$O$_3$ | 0.03 | 9.2 | wear |
|  | 2 | 60 | 10 | TiC(97), Al(3) | cBN, TiC, TiB$_2$(AlB$_2$), Al$_2$O$_3$ | 0.03 | 10.3 | wear |
|  | 3 | 70 | 7 | TiC(98), Al(2) | cBN, TiC, TiB$_2$(AlB$_2$), Al$_2$O$_3$ | 0.03 | 8.7 | wear |
|  | 4 | 60 | 3 | TiC(97), Al(3) | cBN, TiC, TiB$_2$(AlB$_2$), Al$_2$O$_3$ | 0.01 | 7.9 | wear |
|  | 5 | 60 | 30 | TiC(97), Al(3) | cBN, TiC, TiB$_2$(AlB$_2$), Al$_2$O$_3$ | 0.1 | 8.6 | wear |
|  | 6 | 60 | 10 | TiC(70), TiCN(28), Al(2) | cBN, TiC, TiCN, TiB$_2$(AlB$_2$), Al$_2$O$_3$ | 0.02 | 7.6 | wear |
|  | 7 | 60 | 10 | TiC(70), ZrC(28), Al(2) | cBN, TiC, ZrC, TiB$_2$(AlB$_2$), Al$_2$O$_3$ | 0.02 | 8.2 | wear |
| Comparative Example | 1 | 10 | 35 | TiC(80), Al(20) | cBN, TiC, TiB$_2$(AlB$_2$), AlN, Al$_2$O$_3$ | 0.03 | 3.6 | chipping |
|  | 2 | 85 | 10 | TiC(100) | cBN, TiC, TiB$_2$(AlB$_2$) | 0.03 | 2.6 | wear |
|  | 3 | 60 | 0 | TiC(97), Al(3) | cBN, TiC, Al$_2$O$_3$ | 0 | 3.3 | chipping |
|  | 4 | 60 | 0 | TiC(40), TiN(20), HfC(20), Al(20) | cBN, TiC, TiB$_2$(AlB$_2$), AlN, HfB$_2$ | 0.42 | 2.2 | wear |

[*1]Mass % of the metal layer to the mass of cBN particles.
[*2]The numeric value in the parentheses implies mass % in the binder phase.

TABLE 2

|  |  | Volume ratio | |
|---|---|---|---|
|  |  | Covered cBN particles[*1] (%) | cBN particles not covered (%) |
| Example | 8 | 12(15) | 50 |
|  | 9 | 32(15) | 30 |
|  | 10 | 45(15) | 17 |
|  | 11 | 6(15) | 56 |
|  | 12 | 100(15) | 0 |

[*1]The value in the parentheses indicates the amount (mass %) of the metal layer cover.

TABLE 3

|  |  | cBN content ratio (volume %) | Content ratio of second component[*1] (volume %) | Raw material constituting binder phase[*2] | Compound constituting cBN sintered body | $I_2/I_1$ | Surface-constituting ratio (%) | Tool service life (km) | Damage type |
|---|---|---|---|---|---|---|---|---|---|
| Example | 8 | 60 | 1 | TiC(95), Al(5) | cBN, TiC, TiB$_2$(AlB$_2$), Al$_2$O$_3$ | 0.02 | 20 | 4.6 | wear |
|  | 9 | 60 | 5 | TiC(95), Al(5) | cBN, TiC, TiB$_2$(AlB$_2$), Al$_2$O$_3$ | 0.03 | 50 | 5.2 | wear |
|  | 10 | 60 | 10 | TiC(95), Al(5) | cBN, TiC, TiB$_2$(AlB$_2$), Al$_2$O$_3$ | 0.07 | 70 | 4.2 | wear |
|  | 11 | 60 | 0.5 | TiC(95), Al(5) | cBN, TiC, TiB$_2$(AlB$_2$), Al$_2$O$_3$ | 0.01 | 10 | 3.7 | wear |
|  | 12 | 60 | 20 | TiC(95), Al(5) | cBN, TiC, TiB$_2$(AlB$_2$), Al$_2$O$_3$ | 0.1 | 80 | 3.3 | wear |
| Comparative Example | 5 | 59 | 0.2 | — | cBN, TiC, WC | 0 | 0 | 1.1 | chipping |
|  | 6 | 62 | 40 | — | cBN, TiC, TiB$_2$(AlB$_2$), Al$_2$O$_3$ | 0.23 | 5 | 0.6 | wear |

[*1]Volume ratio of second component in the binder phase.
[*2]The numeric value in the parentheses implies mass % in the binder phase.

Evaluation of cBN Sintered Body

The cBN sintered body of each example and each comparative example had the "ratio $I_2/I_1$ of X-ray diffraction intensity", "cBN content ratio", "surface-constituting ratio" and "compound constituting cBN sintered body" calculated as set forth below.

X-Ray Diffraction Intensity Ratio $I_2/I_1$

The cBN sintered body of each example and each comparative example was subjected to X-ray diffraction measurement using an X-ray diffraction apparatus (product name: SmartLab-2D-PILATUS (made by Rigaku Corporation)) to measure the X-ray diffraction intensity $I_1$ of plane (200) of the first component and the X-ray diffraction intensity $I_2$ of plane (101) of the second component. The ratio $I_2/I_1$ thereof is indicated in the column of "$I_2/I_1$" in Tables 1 and 3.

cBN Content Ratio

The "cBN content ratio" in Tables 1 and 3 represent the volume ratio of cBN particles in the cBN sintered body, and was calculated as set forth below. The produced cBN sintered body of each example and each comparative example was mirror-polished. The cBN sintered body structure of an arbitrary region was scanned to obtain a reflection electron image at the magnification of 5000 through an electron microscope. A black region, a gray region, and a white region were observed in the image. By inspecting the observation image through an auxiliary EDX (energy dispersive X-ray analysis), it was inferred that the black region corresponds to cBN particles, whereas the gray region and white region correspond to the binder phase.

The 5000× picture taken as set forth above was subjected to binarization using image processing software to calculate the total area of the region occupied by cBN particles (black region) in the picture. The percentage of the black region to the cBN sintered body in the picture was indicated in Tables 1 and 3 as the volume % of cBN particles.

Surface-Constituting Ratio

"Surface-constituting ratio" in Table 3 represents the ratio of the second component occupying the surface of the cubic boron nitride particle, and was calculated as set forth below using an observation image of 10000× in magnification taken by a method similar to that set forth above. First, twenty cBN particles having a grain size greater than or equal to 1 μm were selected, and the sum of the outer perimeter was calculated. Then, the sum of the length of the region in contact with the second component, among the outer perimeter of the cBN particles was calculated. By dividing the sum of the length of the region in contact with the second component by the sum of the outer perimeter of the cBN particles, the surface-constituting ratio (%) of the second component relative to the surface of cBN particle was calculated. The results are shown in Table 3.

In the 10000× image set forth above, a cBN sintered body having a high volume ratio of cBN particles had 10 or more cBN particles observed in one image, whereas a cBN sintered body having a low volume ratio of cBN particles had less than or equal to 5 cBN particles observed in one image. In each of the examples and comparative examples, a plurality of observation images were prepared so as to calculate the surface-constituting ratio all based on 20 cBN particles having a grain size greater than or equal to 1 μm.

Compound Constituting cBN Sintered Body

The compound constituting the cBN sintered body of each example and each comparative example was identified as set forth below. An arbitrary region of a mirror-polished plane of the cBN sintered body was scanned to obtain a picture of 50000× in magnification by an electron microscope. Through an auxiliary EDX, the compound was inferred based on the overlapping state of each type of element and the compound identification result by the X-ray diffraction measurement. The results of the composition analysis of EDX measured as set forth above are indicated in the column of "compound constituting cBN sintered body" of Tables 1 and 3.

Cutting Test

As a substrate made of cemented carbide, cemented carbide having the form of ISO CNMA120408 (corresponding to K10) was prepared. The cubic boron nitride sintered body of each example and each comparative example (shape: a triangular prism having a thickness of 2 mm, with the bottom corresponding to an isosceles triangle of which the two equal sides, each 2.5 mm, have a vertex of 80°) was joined to the cutting edge of the substrate by means of brazing filler metal made of Ti—Zr—Cu.

In Examples 1-7 and Comparative Examples 1-4, cutting work was carried out under the conditions of Cutting Test 1 set forth below until the damage width exceeds 0.2 mm. In Examples 8-12 and Comparative Examples 5 and 6, cutting work was carried out under the conditions of Cutting Test 2 set forth below until the damage width exceeds 0.2 mm. In both Cutting Tests 1 and 2, the point in time when the damage width exceeds 0.2 mm was taken as the service life of the tool. The cutting distance (km) up to that point in time is shown in the column of "tool service life" in Tables 1 and 3. As used herein, "damage width" implies the wear width or chipping width, indicting a longer tool service life as the length is greater. The type of damage (either "wear" or "chipping"), when arriving at the end of service life of the tool, is indicated in the column of "damage type" in Tables 1 and 3.

Cutting Test 1

Workpiece: FCD450 (hardness: 160HB, contour cutting of a round rod having a V trench at the outer circumferential face)
Cutting conditions: Cutting speed Vc=400 m/min.
Feeding rate f=0.2 mm/rev.
Cutting amount $a_p$=0.2 mm
Wet cutting Cutting Test 2

Workpiece: FCD700 (hardness: 260HB, contour cutting of a round rod having a V trench at the outer circumferential face)
Cutting conditions: cutting speed Vc=400 m/min
Feeding rate f=0.2 mm/rev.
Cutting amount $a_p$=0.2 mm
Wet cutting It is apparent from the results of "tool service life" in Tables 1 and 3 that the cubic boron nitride sintered body tool of the present invention in Examples 1-12 had the tool service life increased as compared to the cubic boron nitride sintered body tools of Comparative Examples 1-6.

It is thought that the reason why the service life of the tool in Examples 1-12 was improved is due to the high compatibility between heat resistance and chipping resistance achieved mainly by the ratio $I_2/I_1$ being greater than or equal to 0.01 and less than or equal to 0.1, where $I_1$ is the X-ray diffraction intensity of plane (200) of the first component and $I_2$ is the X-ray diffraction intensity of plane (101) of the second component.

It is thought that the reason why the cBN sintered body of Comparative Example 1 was damaged by chipping is due to the content ratio of the cBN particles being 10 volume % that is significantly below the lower limit (30 volume %) defined in the present invention. It is thought the reason why the tool service life was short in Comparative Example 2 is due to the content ratio of cBN particles being 85 volume % that exceeds the upper limit (70 volume %) defined in the present invention.

It was thought the reason why Comparative Example 3 exhibited damage by chipping is due to the diffraction peak ratio $I_2/I_1$ of the X-ray diffraction intensity being 0 that is below the lower limit (0.01) defined in the present invention. Furthermore, it was thought that the reason why the tool service life in Comparative Example 4 was short is due to the diffraction peak ratio $I_2/I_1$ of the X-ray diffraction intensity being 0.42 that exceeds the upper limit (0.1) defined in the present invention.

Although the present invention has been described based on embodiments and examples in the foregoing, it is intended that the configuration of the embodiments and examples set forth above may be combined appropriately.

It should be understood that the embodiments and examples disclosed herein are illustrative and non-restrictive in every respect. The scope of the present invention is defined by the terms of the claims, rather than the description above, and is intended to include any modifications within the scope and meaning equivalent of the terms of the claims.

The invention claimed is:

1. A cubic boron nitride sintered body tool having a cubic boron nitride sintered body including cubic boron nitride particles and a binder phase at at least a cutting edge, wherein
said cubic boron nitride sintered body includes 40-70 volume % of said cubic boron nitride particles,
said binder phase includes a first component and a second component,
said first component is TiC,
said second component is one or both of $TiB_2$ and $AlB_2$, and
when X-ray diffraction intensity of plane (200) of said first component is $I_1$ and X-ray diffraction intensity of plane (101) of said second component is $I_2$, said $I_1$ is the maximum of the X-ray diffraction intensity of all components in said cubic boron nitride sintered body excluding said cubic boron nitride particles, and satisfies $0.01 \leq I_2/I_1 \leq 0.1$, wherein at least a portion of said second component is present so as to come into contact with a surface of the cubic boron nitride particle, a surface-constituting ratio of said second component at the surface of the cubic boron nitride particle is 20-70%, and said binder phase includes 1-10 volume % of said second component.

* * * * *